(12) United States Patent
Teulou et al.

(10) Patent No.: US 9,790,982 B2
(45) Date of Patent: Oct. 17, 2017

(54) PIVOT LINKING DEVICE AND METHOD FOR LINKING MECHANICAL PARTS

(71) Applicant: AIRBUS OPERATIONS (SAS), Toulouse (FR)

(72) Inventors: Olivier Teulou, Gragnague (FR); Pascal Peries, Balma (FR)

(73) Assignee: Airbus Operations (SAS), Toulouse (FR)

( * ) Notice: Subject to any disclaimer, the term of this patent is extended or adjusted under 35 U.S.C. 154(b) by 183 days.

(21) Appl. No.: 14/603,506

(22) Filed: Jan. 23, 2015

(65) Prior Publication Data

US 2015/0204378 A1 Jul. 23, 2015

(30) Foreign Application Priority Data

Jan. 23, 2014 (FR) .................................... 14 50549

(51) Int. Cl.
| | | |
|---|---|---|
| *F16C 11/06* | (2006.01) | |
| *F16C 11/08* | (2006.01) | |
| *F16C 11/10* | (2006.01) | |
| *F16C 11/12* | (2006.01) | |

(52) U.S. Cl.
CPC ........ *F16C 11/0614* (2013.01); *F16C 11/069* (2013.01); *F16C 11/0685* (2013.01); *F16C 11/08* (2013.01); *F16C 11/106* (2013.01); *F16C 11/12* (2013.01); *Y10T 29/4968* (2015.01); *Y10T 29/49648* (2015.01); *Y10T 403/32639* (2015.01); *Y10T 403/32713* (2015.01); *Y10T 403/32811* (2015.01)

(58) Field of Classification Search
CPC ..... F16C 11/0614; F16C 11/069; F16C 11/08; F16C 11/106; Y10T 403/32631; Y10T 403/32311; Y10T 403/32713; Y10T 403/32811; Y10T 29/49648; Y10T 403/32639; Y10T 403/32688
USPC .... 403/111, 122, 129, 144, 132; 267/140.12
See application file for complete search history.

(56) References Cited

U.S. PATENT DOCUMENTS

| | | | | |
|---|---|---|---|---|
| 2,115,629 | A | * | 4/1938 | Gurley .................. B60D 1/065 280/512 |
| 2,675,279 | A | * | 4/1954 | Heim .................. F16C 11/0614 384/208 |
| 3,034,809 | A | * | 5/1962 | Greenberg .............. F21V 21/29 285/267 |
| 3,389,925 | A | * | 6/1968 | Gottschald .......... F16C 11/0657 403/113 |

(Continued)

FOREIGN PATENT DOCUMENTS

FR 1 089 843 3/1955

OTHER PUBLICATIONS

French Preliminary Report cited in FR 1450549 completed Jul. 8, 2014.

*Primary Examiner* — Ryan Kwiecinski
(74) *Attorney, Agent, or Firm* — Nixon & Vanderhye P.C.

(57) ABSTRACT

A device including a ball, cage housing the ball and a centering lug, wherein the centering lug has a generally annular form with a radially outer annular periphery and a radially inner annular periphery, the outer annular periphery is integral with the cage and the inner annular periphery is inserted in a groove in the outer periphery of the ball, and the centering lug is elastic and arranged to hold the ball along a predefined axis in a rest position.

8 Claims, 3 Drawing Sheets

(56) References Cited

U.S. PATENT DOCUMENTS

| | | | | |
|---|---|---|---|---|
| 3,401,964 A * | 9/1968 | Johnson | F16C 11/0614 | 384/203 |
| 3,467,452 A * | 9/1969 | McElroy | F16C 11/0604 | 384/203 |
| 3,537,163 A * | 11/1970 | Steidl | B25B 27/20 | 29/441.1 |
| 4,227,826 A * | 10/1980 | Conrad | F16D 1/09 | 279/16 |
| 4,515,336 A * | 5/1985 | Fischer | F16C 11/0619 | 248/288.51 |
| 4,701,990 A * | 10/1987 | Kehl | F16C 11/069 | 29/441.2 |
| 4,764,048 A * | 8/1988 | Kehl | F16C 11/06 | 403/11 |
| 5,153,976 A * | 10/1992 | Benchaar | B23P 11/005 | 29/436 |
| 5,360,282 A * | 11/1994 | Nagengast | B60Q 1/0683 | 403/119 |
| 2003/0147688 A1 * | 8/2003 | Hathaway | F16C 11/0619 | 403/90 |
| 2007/0212165 A1 * | 9/2007 | Rechtien | F16C 11/0614 | 403/132 |
| 2009/0252443 A1 | 10/2009 | Gaumer | | |
| 2010/0051438 A1 | 3/2010 | Balsells et al. | | |
| 2015/0362019 A1 * | 12/2015 | Polanco | F16C 11/0614 | 384/146 |
| 2016/0003293 A1 * | 1/2016 | Blachon | F16C 23/046 | 384/212 |

\* cited by examiner

PIVOT LINKING DEVICE AND METHOD FOR LINKING MECHANICAL PARTS

REFERENCE TO RELATED APPLICATION

This application claims the benefit of French Patent Application 1450549 filed on Jan. 23, 2014, the entirety of which is incorporated by reference.

BACKGROUND OF THE INVENTION

It is known that to achieve an articulated connection between two mechanical parts, an operator may use a pivot linking device, sometimes simply called a "ball joint" or "ball fixing joint".

A pivot linking device generally comprises a ball which is partially spherical (generally in the form of a sphere truncated at the two poles) and an outer cage. The outer cage has an inner housing in which said ball is housed.

To achieve an articulated connection between two mechanical parts using a pivot linking device, the outer cage may be fixed to a first mechanical part. The ball is fixed to a second mechanical part, by a fixing pin passing from one side of the spherical ball to the other at the level of its truncated poles.

In the absence of stress, the ball assumes a neutral position in the cage on a predetermined axis. When an action is applied to the articulated connection, the ball moves to a different position from the neutral position. It may be necessary or at least useful for the ball to resume this neutral position after the action.

BRIEF SUMMARY OF THE INVENTION

The pivot linkage device disclosed herein comprises at least a partially spherical ball and a cage provided with an inner housing in which said ball is housed, which allows the ball to resume such a neutral position.

A pivot linking device has been conceived and is disclosed herein including a centering lug in addition to the ball and cage, the centering lug has a generally annular form comprising a radially outer annular periphery, called the outer periphery, and a radially inner annular periphery, called the inner periphery, wherein the outer periphery of the centering lug is integral with the cage and the inner periphery of the centering lug is inserted in a groove made in the ball around its periphery, said centering lug being elastic and arranged so as to hold the ball along a predefined axis in a rest position.

The centering lug holds the ball of the linking device in a neutral position in the absence of action or use of the pivot linking device. Due to its elastic properties, the ball returns to the neutral position after an action has moved it to another position to allow an articulation or tilting.

The pivot linking device may have at least some of the following characteristics taken individually or in combination:

a) the inner periphery of the centering lug has an open toric form in cross section, the radius of said toric form being adapted to a rounded form of the base of the groove of the ball;

b) at its axial ends, the ball has shoulders configured to come to rest on part of the structure of the cage when the ball is inclined in relation to the cage by a tilt angle equal to a predefined limit angle;

c) said groove is produced around the ball in a plane which is orthogonal to an axis of symmetry, and in rest position, the middle plane of the centering lug is situated in this plane;

d) on its outer periphery, the centering lug comprises a plurality of notches, wherein a fixing element passes through each said notch;

e) the centering lug comprises two lug parts, preferably two half lugs, held respectively by the two cage parts of the cage, preferably two half cages.

A method has been conceived and is disclosed herein to produce a pivot linking device. The method may include the steps of:

a) the separate production of the ball provided with the groove, the centering lug and the two cage parts, preferably two half cages;

b) the mounting of the centering lug on the ball and the assembly of the two cage parts surrounding the ball and holding the centering lug at the level of a junction zone of the two cage parts, and the fixing of these two cage parts together.

Step b) may include an operation for mounting the centering lug in hot state on the cold-shrunk ball.

Step a) may include an operation for producing the centering lug in two lug parts, and step b) positions the two lug parts around the ball.

Step a) may include an operation for producing the centering lug with a radial cut, and step b) positions the centering lug around the ball by spreading it open at the cut.

BRIEF DESCRIPTION OF THE DRAWINGS

The attached drawings will explain clearly how the invention can be implemented. On these drawings, identical references designate similar elements.

DETAILED DESCRIPTION OF THE INVENTION

Figure 1:
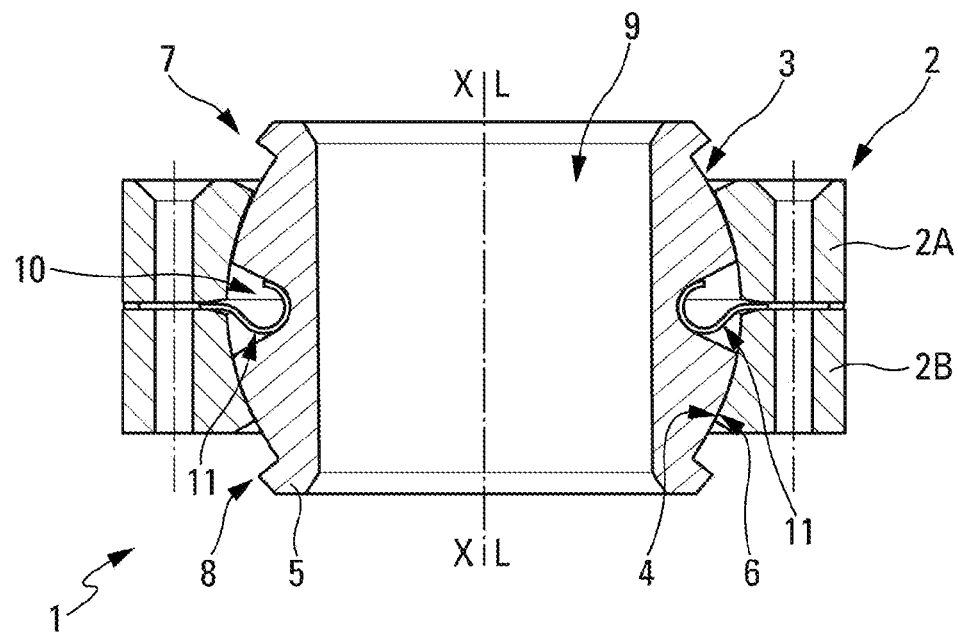
FIGS. 1 and 2 show cross sections of a pivot linking device, wherein the device is shown in a rest position in FIG. 1 and in a position with a tilt angle in FIG. 2.
Figure 2:
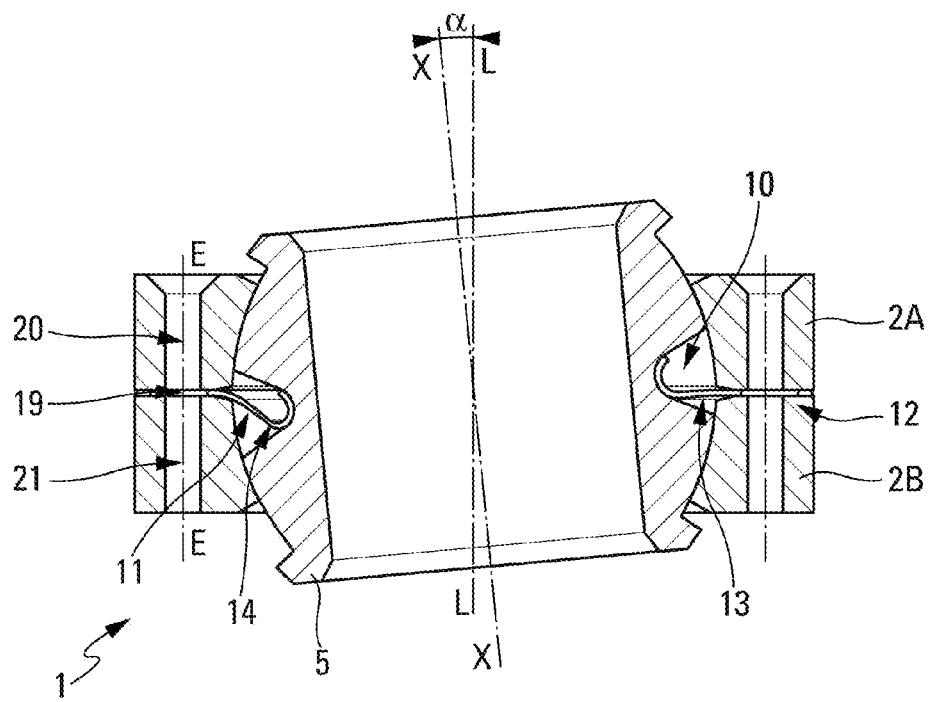

The pivot linking device 1, illustrating the invention and shown diagrammatically in two different positions specified below on FIGS. 1 and 2, is able to allow the creation of an articulated connection between two mechanical parts.

The linking device 1 includes an outer cage 2 with a through orifice forming an inner housing 3 with an inner surface 4; and a ball 5 mounted in the cage 2 by insertion in the inner housing 3, the ball 5 having an outer face 6 which is complementary with the inner face 4 of the housing 3 and is in contact therewith.

The ball 5 has a symmetry of revolution about an axis of symmetry X-X. The ball 5 has a spherical form truncated at two axial ends 7 and 8 in relation to a direction defined by axis X-X. The cage 2 has a reference axis L-L corresponding to the axis of symmetry of the inner housing 3. The ball 5 is also provided with a longitudinal through bore 9 along axis X-X, in which a conventional fixing pin can be mounted (not shown).

The linking device 1 allows for a mutual articulation of two mechanical parts (not shown). To achieve this, the ball 5 of the linking device 1 may be integral with a first of these mechanical parts and the cage 2 may be integral with the second of these mechanical parts. The ball 5 is provided with a groove 10 specified below which is produced around its outer periphery, as shown for example on FIG. 3, and said linking device 1 furthermore comprises a centering lug 11.

Figure 4A:
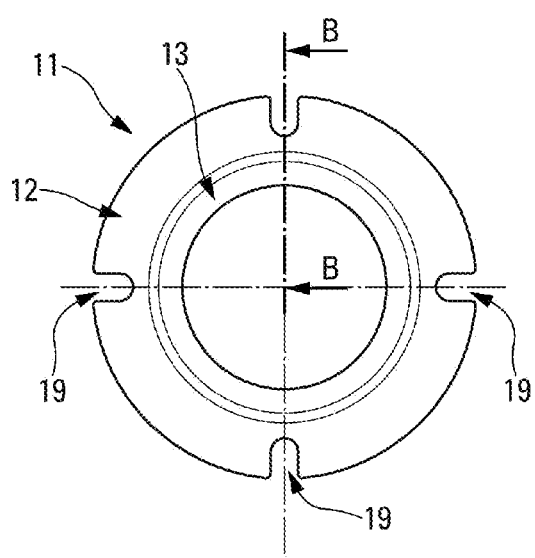
FIG. 4A is a plan view of a centering lug.

The centering lug 11 may a generally annular form as shown on FIG. 4A, comprising a radially outer annular periphery, called the outer periphery 12, and a radially inner annular periphery, called the inner periphery 13. The outer annular periphery 12 may have substantially flat, opposing side surfaces and may be held in a fixed position by the cage 2. The inner periphery 13 of the centering lug 11 may be inserted in the groove 10 produced in the ball 5 around its periphery. The centering lug 11 may be elastic, such that the lug is resilient and returns to its initial form after being deformed. The centering lug is arranged to hold the ball 5 in a neutral position and return it to this position when necessary, as specified below.

This neutral position is such that the axis of symmetry X-X of the ball 5 coincides with the reference axis L-L of the cage 2, as shown on FIG. 1. The centering lug 11 holds the ball 5 in the neutral position in the absence of action or use of the linking device 1.

Due to its elastic properties, the ball 5 returns to the neutral position after an action has brought it to another position, as shown on FIG. 2, for which axis X-X is inclined by a tilt angle α in relation to axis L-L. This characteristic is useful where the connection must be decoupled and then later restored, which is the case from time to time (external action for example, or when an operator wishes to modify the initial position by pressure). The spring-type centering lug 11 ensures that the ball 5 retains the neutral position while allowing articulation, thanks to its flexibility.

Figure 3:
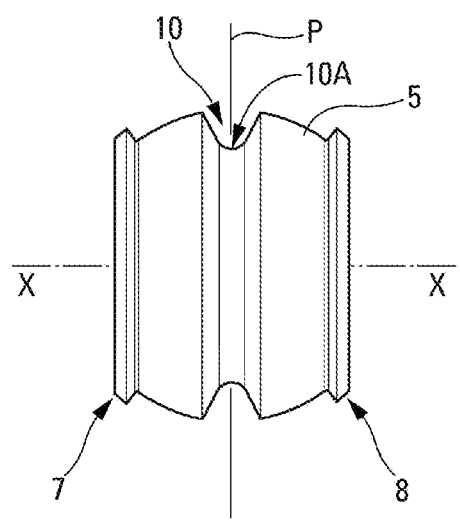
FIG. 3 is a side view of a ball of the pivot linking device.
Figure 4B:
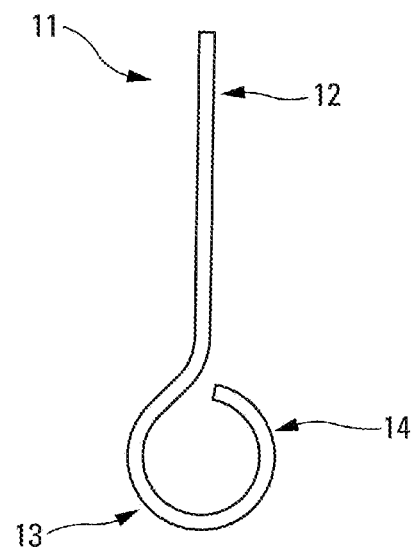
FIG. 4B is a sectional view of a centering lug taken along line B-B of FIG. 4A.

The inner periphery 13 of the centering lug 11 has an open toric form 14 in cross section, as shown on FIG. 4B. This toric form 14 may be deformed as shown on FIG. 2 when the ball 5 is inclined out of its neutral position. The radius of the toric form 14 is adapted to the rounded form of the base 10A of the groove 10 (FIG. 3), and the inner periphery 13 of the centering lug 11 follows this form, as shown for example on FIG. 5C.

The material and thickness of the centering lug 11 may be selected as a function of the rigidity required for support in the proposed application. The centering lug may be produced from a swaged sheet.

Figure 5A:
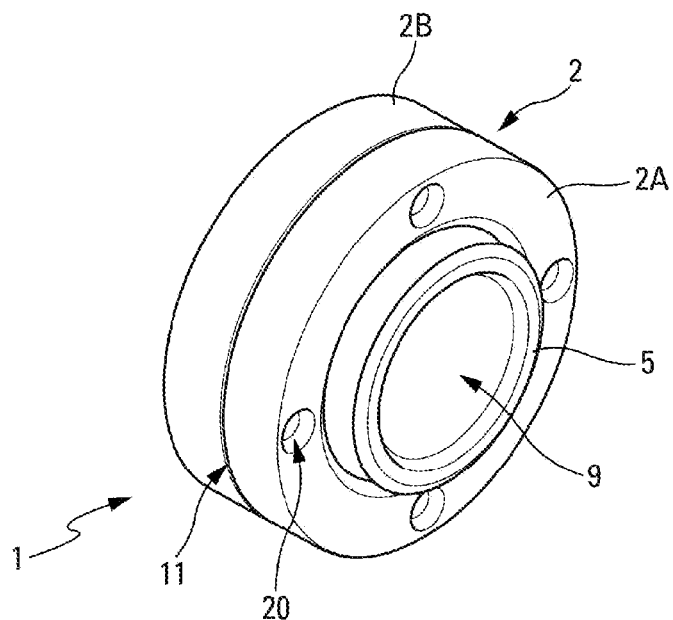
FIGS. 5A to 5C are respectively perspective, plan and section views taken along line C-C of FIG. 5B, of a pivot linking device.
Figure 5B:
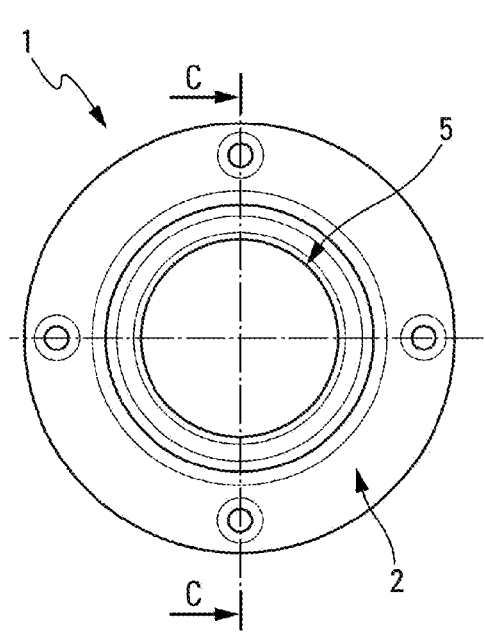
Figure 5C:
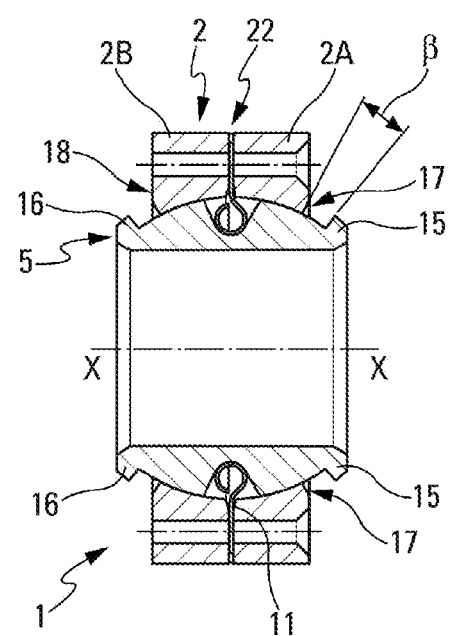

As shown in FIG. 5C, the axial ends 7 and 8 of the ball 5 may include shoulders 15 and 16. The shoulders 15 and 16 are formed to rest on part of the structure 17, 18 of the cage 2 when the ball 5 is inclined in relation to the cage 2, such that axis X-X is inclined by a limit tilt angle α, for example 10°, in relation to axis L-L defining the neutral position. The shoulders 15 and 16 on the flanks of the ball 5 protect the centering lug 11 from being blocked at a stop.

The groove 10 may be produced around the outer periphery of the ball 5 in a plane P which is orthogonal to the axis of symmetry X-X, as shown on FIG. 3. This plane P is positioned along axis X-X in the middle of the ball 5 so as to form a plane of symmetry of the latter. In the rest position, the centering lug 11 is arranged such that its middle plane is situated in this plane P.

The ball 5 may have the form of a sphere truncated at the poles (defining the axial ends 7 and 8) with a groove 10 at the equator (indicated by plane P) of the ball 5. An outer periphery 12 of the centering lug 11 may include of notches 19 as shown on FIG. 4A. These notches 19 may be uniformly distributed around the outer periphery 12. They are intended for fixing the centering lug 11 to the cage 2. For this, a conventional fixing element (not shown) passes through each of these notches 19 when the linking device 1 is assembled, as in the position shown on FIGS. 5A to 5C. The number of notches 19 is selected to obtain sufficient integrity.

The cage 2 may be formed from two cage parts 2A and 2B, such as two half cages. Each of these cage parts 2A and 2B is provided with longitudinal through orifices 20 and 21. These longitudinal orifices 20 and 21, like the notches 19, are formed and aligned along an axis E-E parallel to axis L-L (FIG. 2) such that in each case, a same fixing element (not shown) can pass through these orifices 20 and 21 and this notch 19 to connect together the two parts of the cage 2A and 2B and the centering lug 11.

The centering lug 11, when combined with the groove 10 made in the ball 5, may functions as: in a rest position, when the linking device 1 is not in use, the centering lug holds the ball 5 in a neutral position, wherein the axes X-X and L-L coincide; the centering lug allows articulation due to its flexibility; and the ball returns to the neutral position after an action has caused a tilting (FIG. 2). The linking device 1 may be used in numerous applications. In particular it may be used to lock a fan shroud for an aircraft turbo-engine in a "pin latch" locking system.

A method to produce the linking device 1 may include: producing separately the ball 5 with the groove 10, the centering lug 11 and the two cage parts 2A and 2B; mounting the centering lug 11 on the ball 5; and assembling the two cage parts 2A and 2B to surround the ball 5 and hold the centering lug 11 at the level of a junction zone 22 (FIG. 5C) of the two cage parts 2A and 2B; fixing together the cage parts 2A and 2B using a conventional fixing elements (not shown) that passes through aligned orifices 20 and 21 and notches 19.

The ball 5 may be produced turning or forging/swaging from a tube. Similarly, the parts 2A and 2B of the cage 2 may be formed by turning or forging/swaging. The lug 11 may be produced by hot swaging of a fine sheet.

The cage parts 2A and 2B, such as two half cages, are fixed by screwing or crimping fasteners to the parts to form a cage for the centering lug 11 and the ball 5. The mounting of the centering lug 11 may be performed while the centering lug is in hot state on the cold-shrunk ball 5. The centering lug 11 may be produced in two lug parts, for example in two half rings. The two parts of the lug may be assembled around the ball 5 to form the centering lug 11. The two lug parts may be held by two half cages.

The centering lug may be produced to include a radial cut which is used to open the lug. The centering lug 11 is spread at the cut and positioned around the ball 5 in the manner of a circlip.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A pivot linking device comprising:
   an at least partially spherical ball and a cage with an inner housing containing the ball, and
   a centering lug having a generally annular form comprising a radially outer annular periphery and a radially inner annular periphery, wherein the outer annular periphery is fixed within the cage and the inner annular periphery is in a groove in the periphery of the ball, wherein said centering lug is elastic and arranged so as to hold the ball along a predefined axis in a rest position.

2. The device according to claim 1 wherein the ball is symmetrical about an axis of revolution and the said groove is in a plane orthogonal to said axis, and in that in rest position, a middle plane of the centering lug is in the plane.

3. The device according to claim 1 wherein notches are on an outer periphery of the centering lug and the notches are configured to receive a fixing element.

4. The device according to claim 1 wherein the centering lug comprises two lug parts held respectively by two cage parts of the cage.

5. A pivot linking device comprising:
an at least partially spherical ball and a cage with an inner housing containing the ball, and
a centering lug having a generally annular form comprising a radially outer annular periphery and a radially inner annular periphery, wherein the outer annular periphery is held in a fixed position within the cage and the inner annular periphery is in a groove in the periphery of the ball, wherein said centering lug is elastic and arranged so as to hold the ball along a predefined axis in a rest position,
wherein the inner annular periphery has an open toric form in cross section, the radius of said toric form being adapted to conform to a rounded form of a base of the groove.

6. A pivot linking device comprising:
an at least partially spherical ball and a cage with an inner housing containing the ball, and
a centering lug having a generally annular form comprising a radially outer annular periphery and a radially inner annular periphery, wherein the outer annular periphery is held in a fixed position within the cage and the inner annular periphery is in a groove in the periphery of the ball, wherein said centering lug is elastic and arranged so as to hold the ball along a predefined axis in a rest position,
wherein shoulders at axial ends of the ball are configured to rest on the cage while the ball is inclined in relation to the cage at a tilt angle equal to a predefined limit angle.

7. A pivot linking device comprising:
a ball having a curved outer surface and a groove in the outer surface extending around the perimeter of the outer surface;
a cage including an inner surface in sliding engagement with outer surface of the ball, wherein the ball is held within the cage, and
an annular centering lug having including a radially outer portion fixed within the cage and a radially inner portion extending into the groove of the ball, wherein the radially outer and inner portions are integral and elastic and configured to bias the ball towards a predefined axis.

8. A pivot linking device comprising:
a ball having a curved outer surface and a groove in the outer surface extending around the perimeter of the outer surface;
a cage including an inner surface in sliding engagement with outer surface of the ball, wherein the ball is held within the cage, and
a centering lug having including a radially outer portion held in a fixed position within the cage and a radially inner portion extending into the groove of the ball, wherein the radially outer and inner portions are integral and elastic and configured bias the ball towards a predefined axis,
wherein the radially outer portion of the centering lug is an annular planar section and the radially inner portion is an annular section having a hook-shape in cross section.

* * * * *